(12) United States Patent
Horowitz et al.

(10) Patent No.: US 6,593,927 B2
(45) Date of Patent: Jul. 15, 2003

(54) SQUASH AND STRETCH THREE-DIMENSIONAL RENDERING

(75) Inventors: Daniel P. Horowitz, Issaquah, WA (US); Adam T. Lake, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 09/776,129

(22) Filed: Feb. 1, 2001

(65) Prior Publication Data

US 2002/0130853 A1 Sep. 19, 2002

(51) Int. Cl.[7] .............................................. G06T 15/00

(52) U.S. Cl. ...................................................... 345/473

(58) Field of Search ................................ 345/647, 427, 345/645, 646, 473, 474, 475

(56) References Cited

U.S. PATENT DOCUMENTS

| | | | |
|---|---|---|---|
| 4,600,919 A | 7/1986 | Stern | |
| 5,124,914 A | 6/1992 | Grangeat | |
| 5,163,126 A | 11/1992 | Einkauf et al. | |
| 5,731,819 A | * 3/1998 | Gagne et al. | ............... 345/433 |
| 6,057,859 A | 5/2000 | Handelman et al. | |
| 6,208,347 B1 | 3/2001 | Migdal et al. | |
| 6,337,880 B1 | 1/2002 | Cornog et al. | |
| 6,388,670 B2 | 5/2002 | Naka et al. | |

OTHER PUBLICATIONS

Lewis et al., "Pose Space Deformation: A Unified Approach to Shape Interpolation and Skeleton–Driven Deformation" Siggraph 2000, pp. 165–172. 2000.*

Lasseter, "Principles of Traditional Animation Applied to 3D Computer Animation," In *Proceedings of ACM SIGGRAPH 87*:35–44, 1987.

Thomas et al., "The Illusion of Life: Disney Animation, "*Hyperion*, 3:47–71, New York 1981.

Foley et al., "Computer graphics: principal and practice" Addison–Wesley Publishing Company, 1060–1064, Reading, MA 1996.

Hoppe, "Progressive Meshes" Microsoft Research, 99–108, http://www.research.microsft.com/research/graphics/hoppe/.

Hoppe, "Progressive Simplicicial Complexes" Microsoft Research, http://www.research.microsft.com/~hoppe/.

Hoppe "Efficient Implementation of progressive meshes" Coput. & Graphics vol. 22, No. 1, pp. 27–36, 1998.

Taubin et al., "Progressive Forest Spilt Compression" IBM T.J. Watson Research Center, Yorktown Heights, NY.

Cohen et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

(List continued on next page.)

*Primary Examiner*—Almis R. Jankus
(74) *Attorney, Agent, or Firm*—Fish & Richardson P.C.

(57) ABSTRACT

Rendering a three-dimensional model comprised of three-dimensional data defining a bone and a polygon includes determining a location of a vertex of the polygon relative to the bone, transforming the vertex based on the location to produce a transformed vertex, and rendering the three-dimensional model using the transformed vertex. Determining the location of the vertex includes obtaining a plane that intersects the bone and determining a side of the plane on which the vertex is located.

24 Claims, 7 Drawing Sheets

OTHER PUBLICATIONS

Alliez et al., "Progressive Compression for Lossless Transmission of Triangle Meshes" University of Southern California, Los Angeles, CA, 195–202.

Chow "Optimized Geometry Compression for Real–time Rendering" Massachusetts Institute of Technology, Proceedings Visualization 1997, Oct. 19–24, 1997, Phoenix, AZ, 347–354.

Markosian "Real–Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "Sketch: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison–Wesley Publishing Company, 1060–1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

* cited by examiner

DUCK BEFORE SQUASH AND STRETCH

DUCK AFFECTED BY DECELERATION

DUCK DURING VELOCITY-BASED STRETCH

SQUASH AND STRETCH THREE-DIMENSIONAL RENDERING

TECHNICAL FIELD

This invention relates to rendering a three-dimensional (3D) model using squash and stretch techniques.

BACKGROUND

Squash and stretch effects are applied during non-photorealistic (NPR) rendering of a 3D model to deform the model in response to perceived motion. Squashing results in a 3D model "flattening", e.g., during the force of a collision. Stretching results in the 3D model expanding in a direction opposite to its direction of motion, e.g., to simulate speed as the model moves through space. Squash and stretch effects may also be applied to a 3D model to express elasticity, sketchiness, incompleteness, friction, emotion, and the like.

DESCRIPTION

Figure 1:
FIG. 1 is a view of a Gouraud-shaded 3D model.
Figure 2:
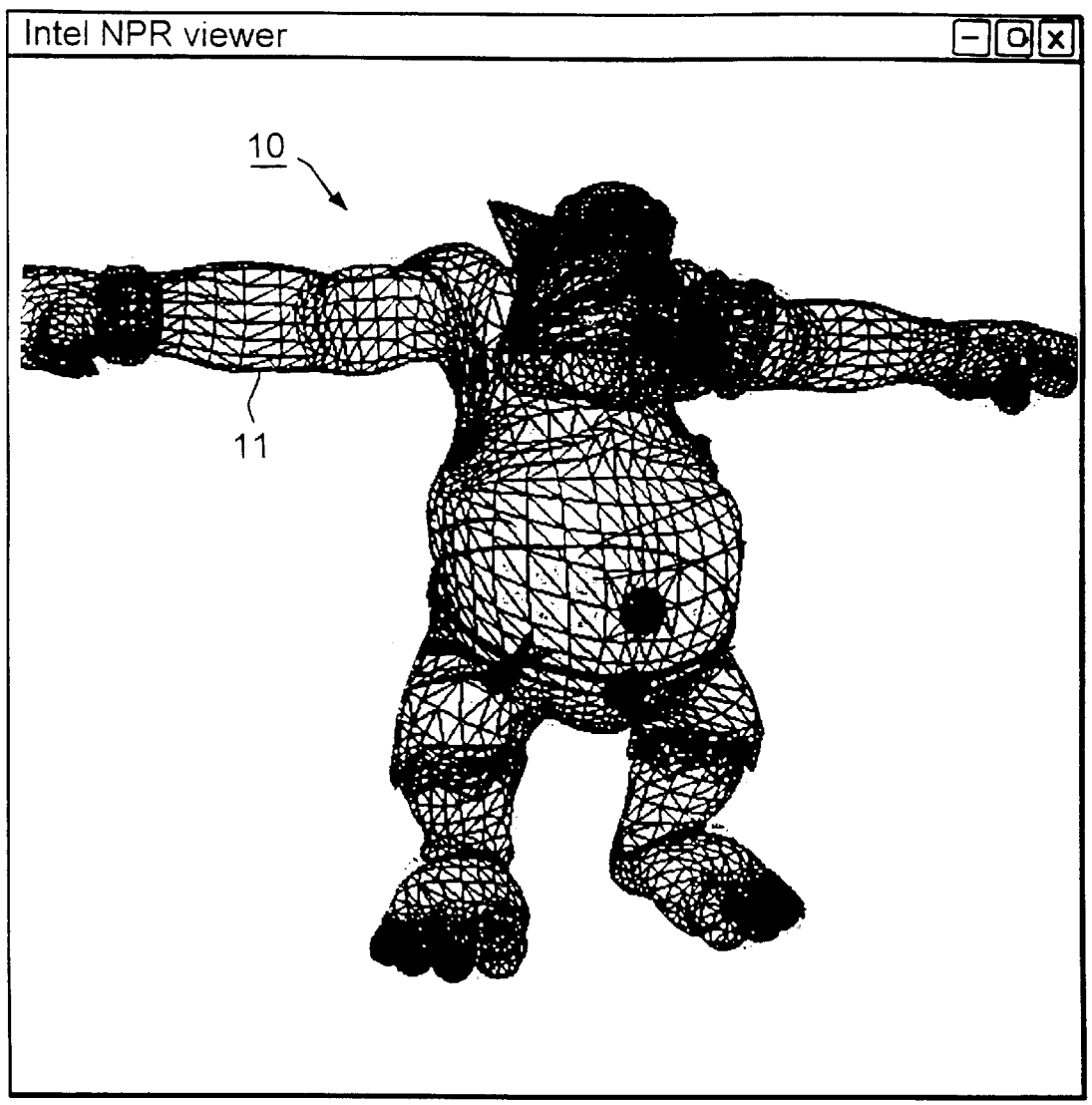
FIG. 2 is a view of polygons in the 3D model.

FIG. 1 shows a 3D model 10, which is rendered from 3D data. As shown in FIG. 2, 3D model 10 is comprised of interconnecting polygons 11. Polygons 11 are triangles in this embodiment; however, other types of polygons may be used. Polygons 11 define the "skin" surface of 3D model 10.

Figure 3:
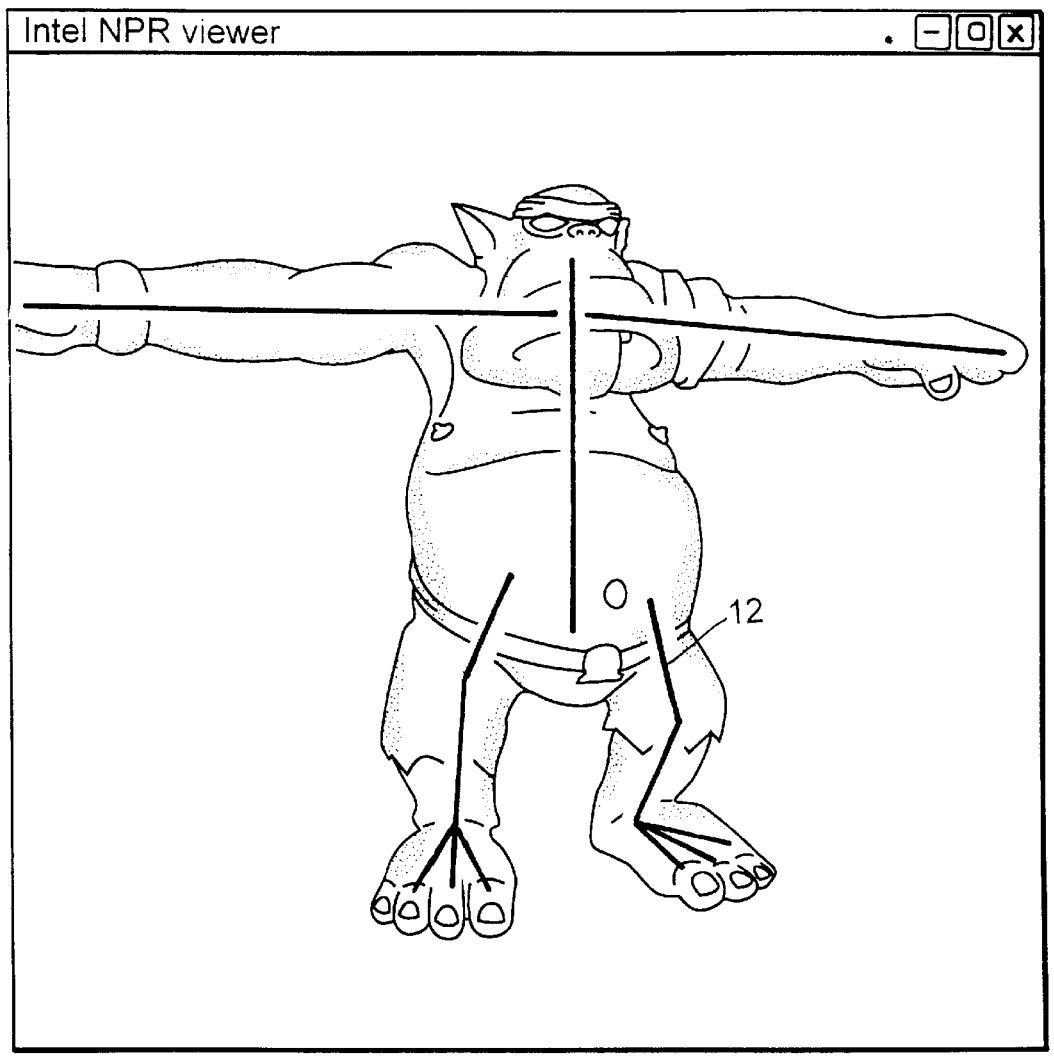
FIG. 3 is a view of bones in the 3D model.

The 3D data for model 10 also includes bone data. The bone data defines a rigid skeletal structure 12 of model 10 (FIG. 3), which corresponds to the bones of a living being. The "bones" of model 10 are Cartesian XYZ-space vectors.

The bones of model 10 are linked together in a tree-like hierarchical structure, with "child" bones branching off from "parent" bones. Each vertex of a polygon 11 is associated with one or more bones of the 3D model. This association is defined in the 3D data that makes up 3D model 10. A polygon deforms around a bone that the polygon is associated with, much the same way that skin surrounding living bone deforms in response to an applied force. The bones may change location in response to such force, but do not change shape.

Figure 4:
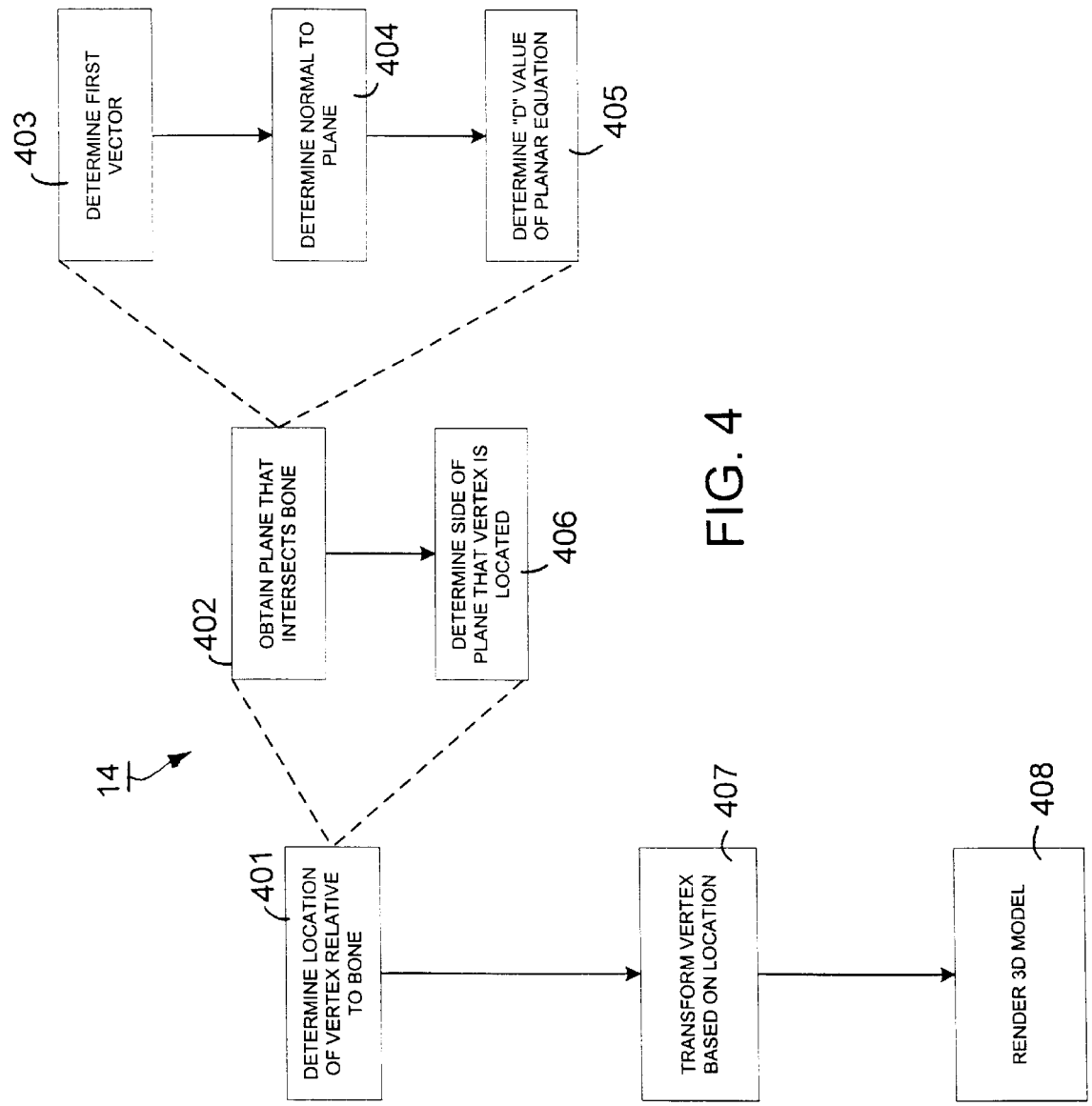
FIG. 4 is a flowchart showing a process for performing squash and stretch techniques on the 3D model.

Referring to FIG. 4, a process 14 is shown for applying squash and stretch effects to polygons of a 3D model, such as model 10, in response to motion of the model. The motion may be velocity, acceleration or any other type of motion.

Figure 5:
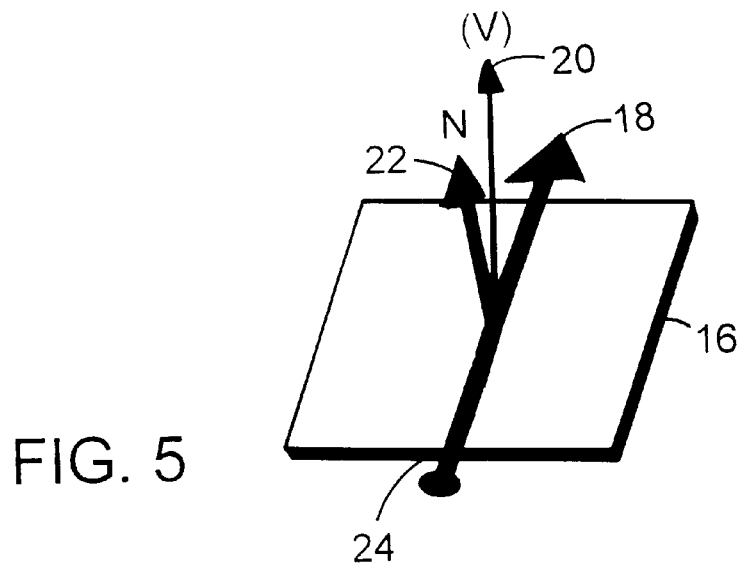
FIG. 5 is a view of a cutting plane used in the process.

Process 14 selects a vertex of a polygon in the model and determines (401) a location of that vertex relative to its associated bone. To do this, process 14 obtains (402) a plane that "cuts" through the bone. This plane is referred to as the "cutting plane". FIG. 5 shows a cutting plane 16 that is obtained for a bone vector (or "bone") 18. The cutting plane is obtained, as follows, using bone vector 18 and a motion vector, e.g., velocity vector 20 (or an acceleration vector), that defines the motion of the bone in 3D space.

The cutting plane normal vector 22 is obtained by determining (403) a first vector, which is the vector cross-product of the velocity vector (V) 20 and bone vector 18. The cutting plane normal vector 22 is obtained (404) by taking the vector cross-product of the first vector and the bone vector 18. In this embodiment, the cutting plane normal vector is defined by Cartesian XYZ coordinate values. Once the cutting plane normal vector coordinate values, defined herein as {PQR}, have been determined, the planar equation is used to determine (405) the final coordinate that defines the cutting plane. The planar equation is as follows:

$$P*G+Q*H+R*J+D=0, \quad (1)$$

where PQR, as noted, are the XYZ coordinates of the normal 22 to the cutting plane, and GHJ are the XYZ coordinates of any vertex that lies on the cutting plane. To determine the value of D, the coordinates of a vertex 24 of bone 18 are selected and substituted for GHJ in the planar equation. Using these values, the planar equation is solved for D. The resulting D value completes the {PQRD} definition of the cutting plane.

Once the cutting plane has been obtained, process 14 determines (406) on which side of the cutting plane 16 the vertex being subjected to squashing/stretching is located. This is done by substituting the XYZ coordinates of the vertex into the GHJ values of the planar equation and determining whether the resulting value is greater than or equal to zero. That is, if $$P*G+Q*H+R*J+D>0, \quad (2)$$

then the vertex is in front of the cutting plane relative to the direction of motion of the bone. On the other hand, if $$P*G+Q*H+R*J+D<0, \quad (3)$$

then the vertex is behind the cutting plane relative to the direction of motion of the bone. As described below, process 14 applies one set of squash and stretch transforms to the vertex if the vertex is in front of the cutting plane, and applies another, different set of squash and stretch transforms if the vertex is behind the cutting plane.

Figure 6:
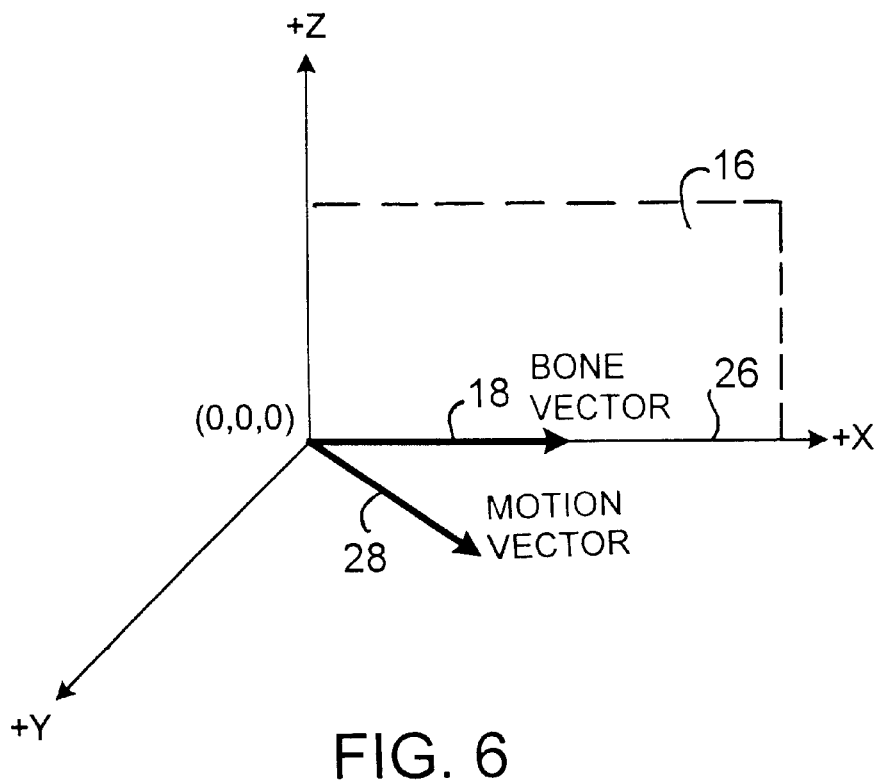
FIG. 6 is a view of a bone vector on the cutting plane.

Process 14 transforms (407) the vertex using a matrix ($B^{-1}$) that transforms the bone from normal 3D, Cartesian XYZ space (or "world space") to "bone space". Referring to FIG. 6, bone space is an orientation in XYZ space where the bone 18 lies on the positive X-axis 26 and starts at point $(X,Y)=(0,0)$. The rotation matrix ($R^{-1}$) then corrects the plane normal so that it is always pointing down the Y-axis. Pointing the plane normal down the Y-axis corresponds to placing the motion vector on the XY-plane with the resulting Y-component being negative. This space is referred to as "rotated bone space". It is noted that, from this point on, unless otherwise indicated, the vectors are in rotated bone space. It is also noted that the rotation matrix ($R^{-1}$) applies to objects in bone space, not to objects in world space.

Process 14 uses a scaling matrix (Sc) to scale the vertex and a shearing matrix (Sh) to determine the direction of the scaling. In this embodiment, there are two scaling matrices ($Sc_1$ and $Sc_2$) and two shearing matrices ($Sh_1$ and $Sh_2$). Generally speaking, one pair of these matrices ($Sc_1$ and $Sh_1$) is applied when the vertex is in front of the cutting plane, and the other pair ($Sc_2$ and $Sh_2$) is applied when the vertex is behind the cutting plane. It is noted that the invention is not limited to using only two sets of matrices or to using the specific matrices described herein.

The scaling and shearing matrices are based on the magnitude and direction of the motion vector 28 of the bone 18 that is associated with the vertex being processed.

The scaling matrix (Sc) is determined using the magnitude of the transformed motion vector. In particular, the magnitude of the transformed motion vector is used to determine a scalar value, referred to as the "stretch scalar", which is included in the scaling matrix and used to scale the Y-component of the vertex in bone space after the $R^{-1}$ transform is applied. The value of the stretch scalar varies depending upon the desired squash and/or stretch effect.

Figure 8:
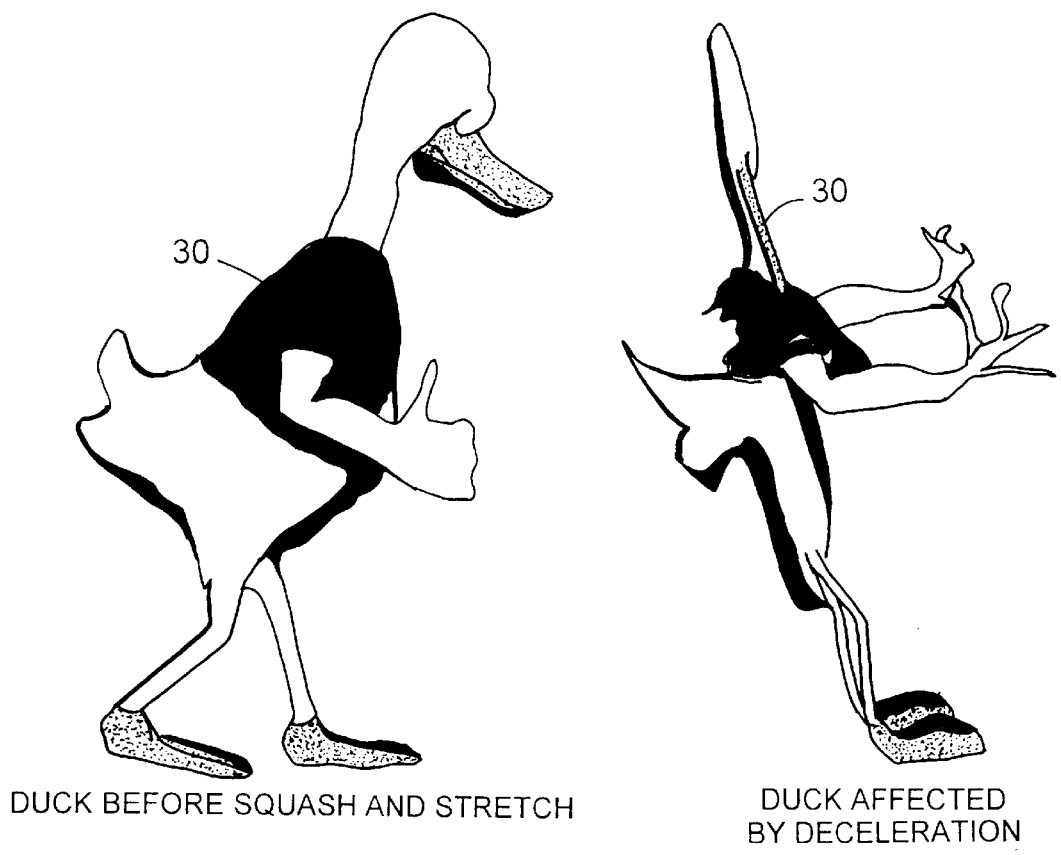
FIG. 8 is a view of a squashing effect achieved via the process of FIG. 4.
Figure 7:
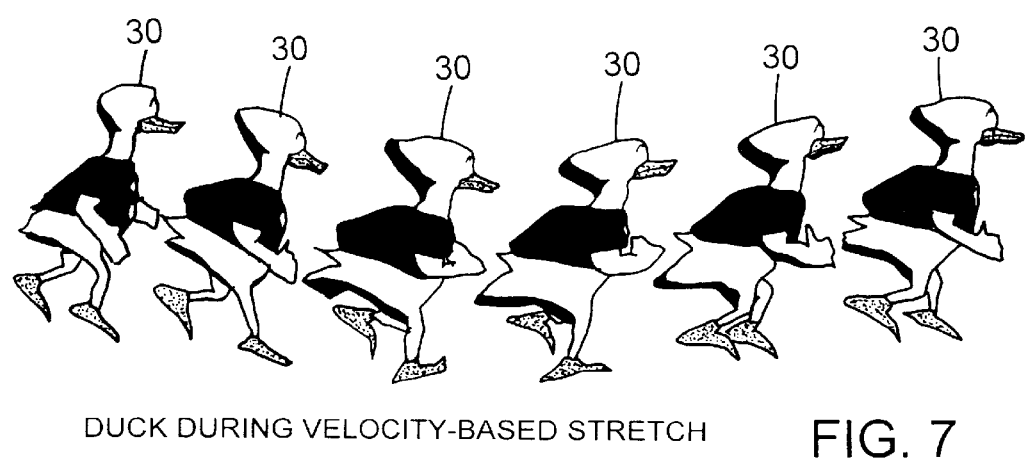
FIG. 7 is a view of a stretching effect achieved via the process of FIG. 4.

Using the magnitude of the acceleration vector to generate the stretch scalar produces a 3D model that stretches only as it accelerates or decelerates. Using the magnitude of the velocity vector to generate the stretch scalar produces a 3D model that stretches more the faster it goes. The higher the value of the stretch scalar, the more the 3D model will stretch and, thus, the more the vertex is deformed. On the other hand, a stretch scalar having a value between zero and one indicates that the 3D model is slowing down and, thus, will produce a squash effect. One example of a stretch effect is depicted in model 30 of FIG. 7. One example of a squash effect is depicted in the same model 30 of FIG. 8.

The selected vertex is scaled differently based on which side of the cutting plane it resides. The direction of the scaling is along the Y-axis of bone space so that the squashing and stretching effects are achieved in the direction of the motion (velocity or acceleration) vector. If the stretch scalar indicates an increasing velocity (i.e., the stretch scalar has a value greater than one), vertices in front of the cutting plane are not scaled along the Y-axis because the rigid bone prevents significant distortion. In this case, vertices behind the cutting plane are scaled as if they are being pulled away from the bone or are loosely attached to the bone (see FIG. 7).

The Z-axis coordinates of the vertices may also be scaled. In this embodiment, the amount of scaling along the Z-axis is the inverse of the scaling along the Y-axis. The resulting effect is that the 3D model bulges around a bone when the velocity is reversed and thins around the bone when the velocity increases. Z-axis scaling is optional and need not necessarily be performed. Z-axis scaling is generally performed to implement volume preservation, meaning to ensure that the volume of the 3D model is substantially the same both before and after scaling.

To minimize the effects, when the motion vector approaches the same direction as the bone on the cutting plane, the stretch scalar is multiplied by the Y component of the motion vector normalized. The Y component of the motion vector is the "angle correlating scalar" (AcS), which acts to prevent/reduce scaling when the motion vector approaches the same direction as the bone. For example, if the motion vector is in the same direction as the bone (the X-direction), the Y component of the motion vector will be zero, resulting in no scaling.

The shearing matrix (Sh) is used to displace the vertices in a desired direction. If shearing follows the velocity vector, then the deformation will follow the motion of the model. Using the direction of acceleration creates an effect known as "follow through", in which the portions of the model that are not held in place rotate outward from the projected path. Reversing the X-value of the shearing matrix will create a "motion blur" effect, in which the 3D model appears formed to the path that it has traveled.

Whichever motion vector is chosen, i.e., the velocity or acceleration vectors, is referred to as the "shearing vector". The shearing vector is normalized and then combined with a scalar to form the shearing matrix. The scalar, in this case, is the "volume correcting scalar" (VcS) and is the Y-component of the shearing vector. The VcS adjusts the amount of shearing so that each vertex is roughly rotated around its current position relative to the bone. This prevents the 3D model from appearing to gain significant amounts of volume from the shear. The VcS is optional since it does not preserve volume. The equation for determining VcS is based on desired characteristics. The VcS is determined from the AcS. The following is an example of an equation for determining the VcS:

$$VcS=1-AcS\cdot(1-AcS).$$

For a vertex $W_i$, which is in front of the cutting plane, process 14 transforms (407) the vertex to obtain a transformed (or "final") vertex $W_f$, as follows:

$$W_f=(B\cdot R\cdot Sh_1\cdot Sc_1\cdot R^{-1}\cdot B^{-1})\cdot W_i \quad (4)$$

For a vertex $W_i$, which is behind the cutting plane, process 14 transforms (407) the vertex to obtain a transformed (or "final") vertex $W_f$, as follows:

$$W_f=(B\cdot R\cdot Sh_2\cdot Sc_2\cdot R^{-1}\cdot B^{-1})\cdot W_i. \quad (5)$$

Values of R and B, which are the inverse matrices for $R^{-1}$ and $B^{-1}$ above, respectively, are applied in equations (4) and (5) above to transform the bone and its associated vertices from rotated bone space (obtained by multiplying world space vectors and vertices by $B^{-1}$ and $R^{-1}$) back into world space (defined above). Process 14 is then repeated for other vertices on the 3D model. Once this is done, process 14 renders (408) the 3D model.

By way of example, assume that a bone of a 3D model is defined by a 4×4 matrix. Assume also that the following $B^{-1}$ matrix transforms the bone from world space to bone space.

$$B^{-1} = \begin{matrix} 0.045 & -0.919 & 0.391 & -257.594 \\ -0.998 & -0.048 & -0.002 & -5.864 \\ 0.016 & -0.390 & -0.920 & 606.869 \end{matrix}$$

In bone space, the bone is lying in the (0,0,0) point of the XYZ axes of bone space and pointing down the positive X-axis (see, e.g., FIG. 6). The value of B, which transforms the bone back into world space, is as follows:

$$B = \begin{matrix} 0.045 & -0.998 & 0.016 & -4.398 \\ -0.919 & -0.048 & -0.390 & 0.015 \\ 0.391 & 0.002 & -0.920 & 659.254 \end{matrix}$$

An animation engine (comprised of machine-executable instructions, e.g., a computer program) provides B and $B^{-1}$ based on the predefined bone vector. That is, the animation engine determines the matrix $B^{-1}$ (and its inverse, B) necessary to transform the bone vector so that it lies on the positive X-axis with its base at point (0,0,0).

In this example, also assume that the motion vector of the bone vector in world space is a velocity vector $V_W$ that has the following values:

$$V_W=(XYZ)$$

$$=(-4.41\ 0.024\ 639.907).$$

The velocity vector in bone space, $V_B$, is $B^{-1} \cdot V_W$, which is $$V_B = (XYZ)$$

$$= (-7.567 \; -0.043 \; 17.8128).$$

The vector $V_B$ is rotated so that it lies on the XY-plane with a negative Y-component (see, e.g., FIG. 6). The angle of rotation for $V_B$, in this example, is determined from the $V_B$ values, as follows $$\text{angle} = \tan^{-1}(Z/Y)$$

$$= \tan^{-1}(17.812/-0.043)$$

$$= -1.573 \text{ radians}.$$

The rotation matrix necessary $R^{-1}$ to achieve this angle of rotation is as follows:

$$R^{-1} = \begin{matrix} 1 & 0 & 0 & 0 \\ 0 & -0.002 & -1.001 & 0 \\ 0 & 1.001 & -0.002 & 0 \\ 0 & 0 & 0 & 1 \end{matrix}$$

The inverse, R, of the foregoing matrix is:

$$R = \begin{matrix} 1 & 0 & 0 & 0 \\ 0 & -0.002 & 0.999 & 0 \\ 0 & -0.999 & -0.002 & 0 \\ 0 & 0 & 0 & 1 \end{matrix}$$

The values of R and $R^{-1}$ are determined by the animation engine.

The cutting plane normal $CP_N$ is determined as follows:

$$CP_N = \beta \times (\beta \times V_W),$$

where $V_W$ is as defined above and $\beta$ is the direction of the bone vector. $\beta$ is determined by multiplying the B matrix by the position of the bone vector in bone space, which, in this example, is $$\beta = B \cdot \begin{matrix} 1 \\ 0 \\ 0 \\ 1 \end{matrix}$$

After performing the calculations, $CP_N$ is determined to be $$CP_N = (0.193 \; -0.3906 \; -0.9205).$$

The cutting plane is determined from $CP_N$ using equation (1). The location of the current vertex relative to the cutting plane is determined using equations (3) and (4).

Assuming that the vertex is in front of the cutting plane, the scaling matrix for this example is $$SC_1 = \begin{matrix} X & 0 & 0 & 0 \\ 0 & Y & 0 & 0 \\ 0 & 0 & Z & 0 \\ 0 & 0 & 0 & 1 \end{matrix}$$

where X, Y and Z are X-axis, Y-axis and Z-axis scaling factors, respectively. The X, Y and Z scaling factors are determined as follows:

$$X = 1$$

$$Y = 1 + AcS \cdot |V_W|/C_S$$

$$Z = 1/Y,$$

where AcS is the angle correcting scalar noted above, $|V_W|$ is the magnitude of the motion vector, and $C_S$ is a scalar ratio for correlating Y and $V_W$. Values for $C_S$ and AcS are determined by the animation engine to achieve a desired squash/stretch effect. The value of $1/C_S$ is the stretch scalar noted above.

The shearing matrix $Sh_1$ is defined as $$Sh_1 = \begin{matrix} 1 & A & 0 & 0 \\ 0 & B & 0 & 0 \\ 0 & C & 1 & 0 \\ 0 & 0 & 0 & 1 \end{matrix}$$

where A, B and C are shearing factors, defined as follows $$C = AcS \cdot B \cdot V_{Z \, (normalized)}$$

$$= 0 \text{ (since the velocity vector lies in the XY plane, resulting in no } V_Z)$$

$$B = VcS$$

$$= 1 - AcS \cdot (1 - AcS)$$

$$A = AcS \cdot B \cdot V_{X(normalized)}$$

where $V_{N(normalized)}$ is the component of the rotated velocity vector along the Y-axis in rotated bone space. Once the shearing matrix is determined, the vertex $W_i$ is transformed using equation (4) or (5) depending on the results of the Boolean expression of equations (1) and (2).

Figure 9:
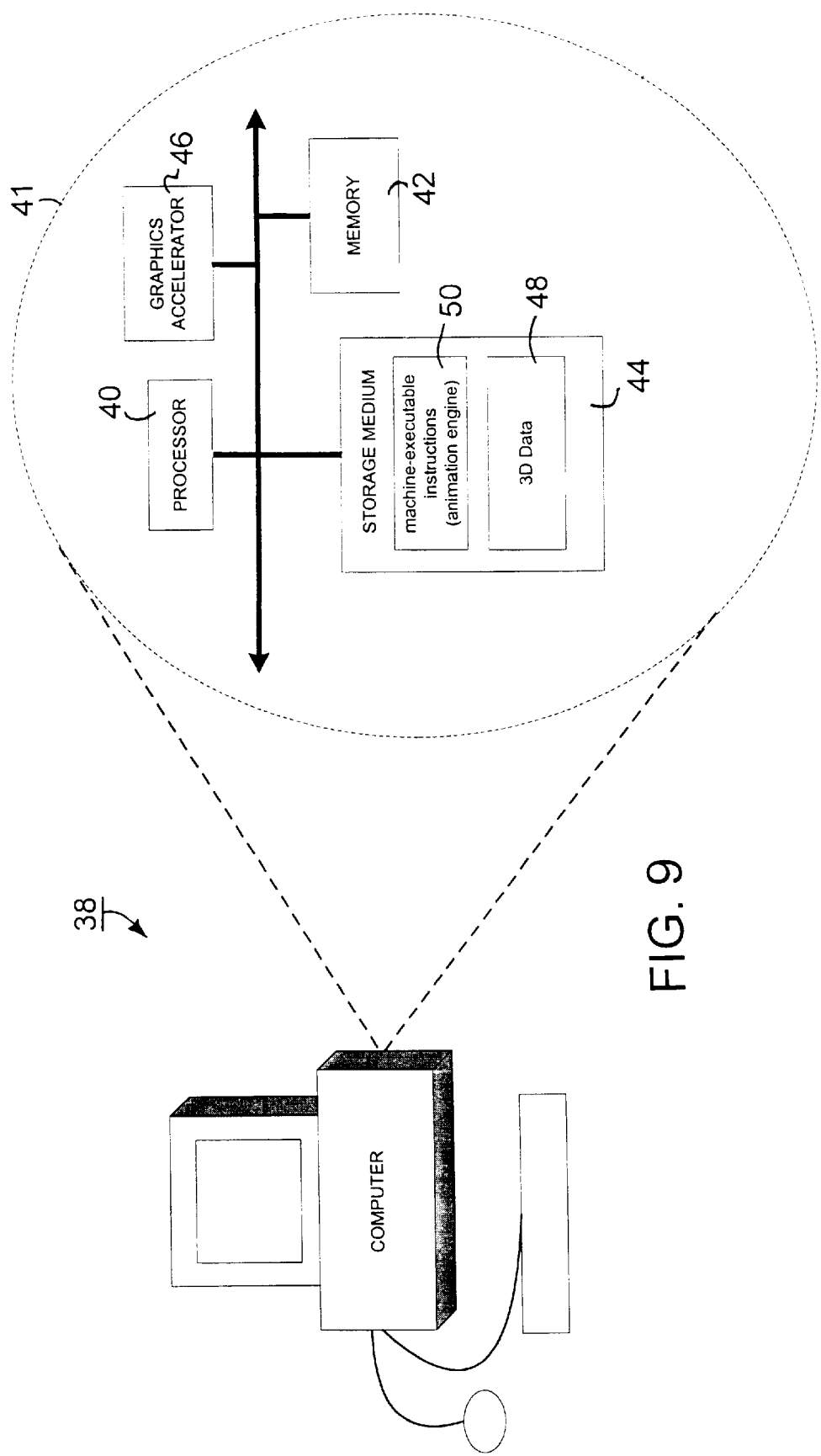
FIG. 9 is a block diagram of a computer system on which the process of FIG. 4 may be implemented.

FIG. 9 shows a computer 38 for rendering 3D models using process 14. Computer 38 includes a processor 40, a memory 42, a storage medium 44 (e.g., a hard disk), and a 3D graphics accelerator 46 for repositioning a 3D model and processing 3D data (see view 41). Storage medium 44 stores 3D data 48 which defines the 3D model, and machine-executable instructions (animation engine) 50, which are executed by processor 40 out of memory 42 to perform process 14 on 3D data 48.

Process 14, however, is not limited to use with the hardware and software of FIG. 9; it may find applicability in any computing or processing environment. Process 14 may be implemented in hardware, software, or a combination of the two. Process 14 may be implemented in computer programs executing on programmable computers that each includes a processor, a storage medium readable by the processor (including volatile and non-volatile memory and/or storage elements), at least one input device, and one or more output devices. Program code may be applied to data entered using an input device, such as a mouse or a keyboard, to perform process 14 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 14. Process 14 may also be implemented as a computer-readable storage medium, configured with a computer program, where, upon execution, instructions in the computer program cause the computer to operate in accordance with process 14.

Other embodiments not described herein are also within the scope of the following claims. For example, process 14 can be performed during a pre-processing stage or it can be performed in real-time. Process 14 can also be performed without reference to bones in a 3D model. That is, the cutting plane can be set arbitrarily and the resulting squashing and stretching determined with reference to the cutting plane in the manner described above. Process 14 is also not limited to use with XYZ coordinate systems.

What is claimed is:

1. A method of rendering a three-dimensional model comprised of three-dimensional data defining a bone and a polygon, the method comprising:
    determining a location of a vertex of the polygon relative to the bone;
    transforming the vertex based on the location to produce a transformed vertex, wherein transforming the vertex includes transforming the vertex using a matrix that transforms the bone to bone space in which the bone lies on a positive X-axis in three-dimensional space and starts at a predetermined reference point; and
    rendering the three-dimensional model using the transformed vertex.

2. The method of claim 1, wherein determining the location of the vertex comprises:
    obtaining a plane that intersects the bone; and
    determining a side of the plane on which the vertex is located.

3. The method of claim 2, wherein transforming comprises applying a first transform to the vertex if the vertex is on one side of the plane and applying a second transform to the vertex if the vertex is on another side of the plane.

4. The method of claim 3, wherein the first and second transforms are based on a vector that defines a motion of the bone.

5. The method of claim 2, wherein a motion vector defines a direction of motion of the bone, and obtaining the plane comprises:
    determining a first vector by taking a vector cross-product of the motion vector and a bone vector that corresponds to the bone; and
    determining a normal vector to the plane by taking the vector cross-product of the bone vector and the first vector.

6. The method of claim 1, further comprising:
    repeating determining and transforming for other vertices of the polygon to produce transformed vertices;
    wherein rendering comprises rendering the three-dimensional model using the transformed vertices.

7. The method of claim 1, wherein a motion vector defines a direction of motion of the bone, and transforming comprises:
    applying scale and directional transforms to the vertex, wherein the scale and directional transforms are based on the motion vector.

8. The method of claim 7, wherein the motion vector comprises a velocity vector or an acceleration vector.

9. An article comprising:
    a readable medium that stores executable instructions for rendering a three-dimensional model comprised of three-dimensional data defining a bone and a polygon, the executable instructions causing a machine to:
    determine a location of a vertex of the polygon relative to the bone;
    transform the vertex based on the location to produce a transformed vertex, wherein transforming the vertex includes transforming the vertex using a matrix that transforms the bone to bone space in which the bone lies on a positive X-axis in three-dimensional space and starts at a predetermined reference point; and
    render the three-dimensional model using the transformed vertex.

10. The article of claim 9, wherein determining the location of the vertex comprises:
    obtaining a plane that intersects the bone; and
    determining a side of the plane on which the vertex is located.

11. The article of claim 10, wherein transforming comprises applying a first transform to the vertex if the vertex is on one side of the plane and applying a second transform to the vertex if the vertex is on another side of the plane.

12. The article of claim 11, wherein the first and second transforms are based on a vector that defines a motion of the bone.

13. The article of claim 10, wherein a motion vector defines a direction of motion of the bone, and obtaining the plane comprises:
    determining a first vector by taking a vector cross-product of the motion vector and a bone vector that corresponds to the bone; and
    determining a normal vector to the plane by taking the vector cross-product of the bone vector and the first vector.

14. The article of claim 9, further comprising instructions that cause the machine to:
    repeat determining and transforming for other vertices of the polygon to produce transformed vertices;
    wherein rendering comprises rendering the three-dimensional model using the transformed vertices.

15. The article of claim 9, wherein a motion vector defines a direction of motion of the bone, and transforming comprises:
    applying scale and directional transforms to the vertex, wherein the scale and directional transforms are based on the motion vector.

16. The article of claim 15, wherein the motion vector comprises a velocity vector or an acceleration vector.

17. An apparatus for rendering a three-dimensional model comprised of three-dimensional data defining a bone and a polygon, the apparatus comprising:
    a memory that stores executable instructions; and
    a processor that executes the instructions to:
    determine a location of a vertex of the polygon relative to the bone;
    transform the vertex based on the location to produce a transformed vertex, wherein transforming the vertex includes transforming the vertex using a matrix that transforms the bone to bone space in which the bone lies on a positive X-axii In three-dimensional space and starts at a predetermined reference point; and
    render the three-dimensional model using the transformed vertex.

18. The apparatus of claim 17, wherein determining the location of the vertex comprises:
    obtaining a plane that intersects the bone; and determining a side of the plane on which the vertex is located.

19. The apparatus of claim 18, wherein transforming comprises applying a first transform to the vertex if the vertex is on one side of the plane and applying a second transform to the vertex if the vertex is on another side of the plane.

20. The apparatus of claim 19, wherein the first and second transforms are based on a vector that defines a motion of the bone.

21. The apparatus of claim 18, wherein a motion vector defines a direction of motion of the bone, and obtaining the plane comprises:

determining a first vector by taking a vector cross-product of the motion vector and a bone vector that corresponds to the bone; and determining a normal vector to the plane by taking the vector cross-product of the bone vector and the first vector.

22. The apparatus of claim 17, wherein the processor executes instructions to:

repeat determining and transforming for other vertices of the polygon to produce transformed vertices;

wherein rendering comprises rendering the three-dimensional model using the transformed vertices.

23. The apparatus of claim 17, wherein a motion vector defines a direction of motion of the bone, and transforming comprises:

applying scale and directional transforms to the vertex, wherein the scale and directional transforms are based on the motion vector.

24. The apparatus of claim 23, wherein the motion vector comprises a velocity vector or an acceleration vector.

* * * * *